STRAPPING MACHINE CONTROL

Original Filed March 17, 1964 4 Sheets-Sheet 1

Inventor
Donald W. Rhea
By William P. Porcelli
Attorney

STRAPPING MACHINE CONTROL

Original Filed March 17, 1964 4 Sheets-Sheet 2

Inventor
Donald W. Rhea
By William F. Porcelli
attorney

STRAPPING MACHINE CONTROL

Original Filed March 17, 1964 4 Sheets-Sheet 3

Inventor
Donald W. Rhea
By William F. Porcelli
Attorney

STRAPPING MACHINE CONTROL

Original Filed March 17, 1964 4 Sheets-Sheet 4

INVENTOR
Donald W. Rhea

By William P. Porcelli
attorney

United States Patent Office

Re. 26,315
Reissued Dec. 5, 1967

26,315

STRAPPING MACHINE CONTROL

Donald W. Rhea, Norridge, Ill., assignor to Interlake Steel Corporation, a corporation of New York Original No. 3,225,683, dated Dec. 28, 1965, Ser. No. 352,562, Mar. 17, 1964. Application for reissue Oct. 17, 1966, Ser. No. 595,549
14 Claims. (Cl. 100—4)

Matter enclosed in heavy brackets [ ] appears in the original patent but forms no part of this reissue specification; matter printed in italics indicates the additions made by reissue.

This invention relates to control systems and particularly to a control system for automatically controlling the travel of a movable carriage to predetermined locations relative to a work piece as, for example, the movement of a strapping device relative to an object around which the strapping device is to apply an encircling binder strap.

In one type of strapping machine used for strapping or binding coils of strip metal, the coils are positioned on end on a conveyor which transports them to a strapping machine. The strapping machine is provided with a carriage which is mounted for vertical movement between a position above the level of the highest coil to be strapped and a position intermediate of the height of the shortest coil to be strapped. If a single strap is to be applied around the coil it is desirable that the strap be positioned at the mid-level of the coil. If two straps are to be applied, it is desirable that the two straps be placed one at each one-third level of the coil. If more than two straps are to be applied, it is desirable that they be spaced at equal increments from each other and the ends of the coil. In the particular type of strapping machine mentioned, the carriage supports a strapping head which feeds a length of strapping from a supply source into a closed loop while the carriage is in its elevated position above the level of a coil to be strapped. Suitable mechanism is provided for lowering the carriage and the formed strap loop to position the strap loop around the coil in readiness for allowing the strapping head to shrink the strap loop onto the coil and secure it in place. After the strap loop is secured in place, the strapping head has mechanism which severs the loop from the supply of strap and allows the strapping head to be returned to its upper position in readiness for producing another strap loop for the next cycle of operation.

It is an important object of this invention to provide a control means for the type of apparatus mentioned which automatically locates the strapping head at a level of a coil corresponding to any predeterimned fraction of the height of the coil to be strapped, independent of the actual height of the coil, within the strapping head movement limits of the apparatus. For example, with this invention it is possible to cause the strapping head to be automatically moved to alignment with the mid-point of the coil where it can apply a binder strap to the coil or the strapping head can be automatically moved to any desired level of the coil as, for further example, to the one-third level of the coil.

It is another object of the invention to provide a control device of the type mentioned which can automatically operate the strapping unit to cause it to sequentially move to a multiple number of different fractional levels of the coil or object to be strapped.

In order to accomplish these objects, it is still another object of the invention to provide a control device which has means for establishing the bottom level of a coil or object and its top level and through different rotational ratios of a control shaft relative to a drive shaft establish the different fractional levels at which the carriage of the strapping head or mechanism is to be arrested for application of a binder strap to the object.

It is still another object to provide such a control means which is electrically controlled by means of switches and magnetic clutches selectively operated to cause sprockets of different speed ratios to be actuated for arriving at selective levels of movement of the strapping carriage.

Another object is to provide a control device embodying a photoelectric cell for obtaining an electric impulse to establish the top level of an object or coil, although a switch contacting the upper level of the coil is suitable under certain conditions. In the more usual case, the diameters of the coils vary so widely that the light beam is the simpler to use effectively. It is more difficult to arrange structure for a mechanical switch to be properly positioned to insure reliable contact with a full range of coil sizes.

It is another object to provide a control device embodying sprockets on a control shaft for driving sprockets on a drive shaft which are selectively driven by the drive shaft as magnetic clutches are selectively activated.

Other objects and advantages of the invention should become apparent upon reference to the accompanying drawings in which:

FIG. 4 shows a simplified wiring diagram for the control means of FIG. 2.

Figure 1:
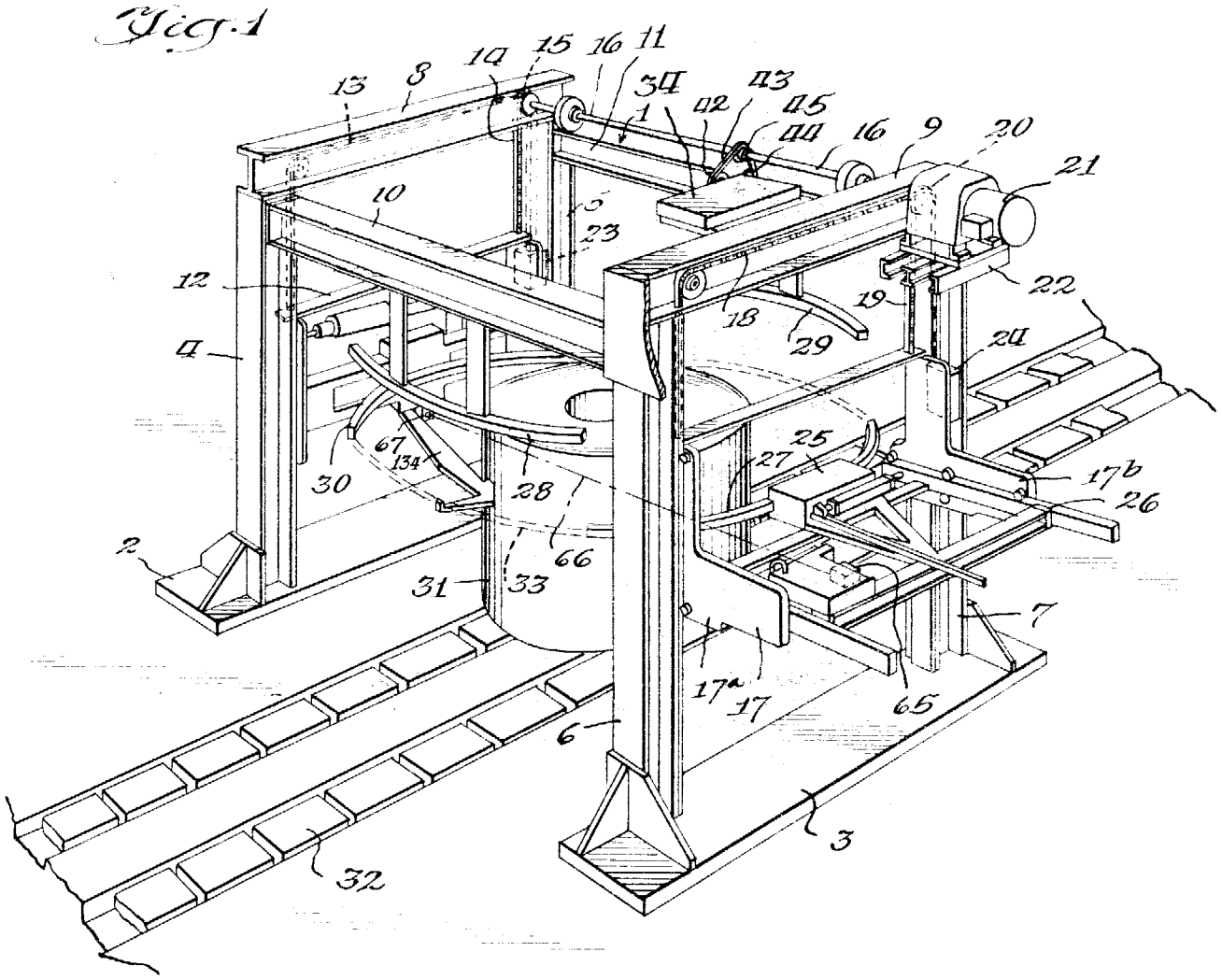
FIG. 1 shows a perspective view of a typical coil strapping machine in which the invention is embodied.

The strapping machine 1 in which the invention is shown embodied consists of two bases 2 and 3; the base 2 supports two corner posts 4 and 5 while the base 3 supports two corner posts 6 and 7. An I-beam 8 is connected between the upper ends of the two posts 4 and 5 while another I-beam 9 is connected across the upper ends of the two posts 6 and 7. Mounted between the posts 4 and 6 at their upper ends is another I-beam 10. Similarly, mounted between the posts 5 and 7 at their upper ends is another I-beam 11. A carriage 12 is mounted for vertical movement between the posts 4 and 5 and is supported by two chains 13 and 14 which are driven by means of sprockets at 15 attached to a shaft 16. Likewise, a carriage 17 is mounted for vertical movement between the two posts 6 and 7 and supported by means of two chains 18 and 19 driven by means of two sprockets at 20 secured to the shaft 16. The shaft 16 is driven in one direction or the other by means of a motor 21 suitably mounted on a platform 22 secured to the post 7.

The chains 13 and 14 are connected at their opposite ends to a counterweight 23 which is guided along the post 5. In a similar manner, the opposite ends of the chains 18 and 19 are secured to another counterweight 24 guided along the corner post 7. With this arrangement, rotation of the shaft 16 by the motor 21 in one direction causes both carriages 12 and 17 to be lowered together while rotation of the shaft 16 by the motor 21 in the opposite direction causes both carriages 12 and 17 to be elevated.

The carriage 17 supports a strapping head 25 secured to a frame 26 mounted for movement toward and away from the object to be strapped on the two end plates 17a and 17b of the carriage 17. The strapping head 25 can be of many types, but one particularly suited for such a structure is shown in copending application Serial No. 711,663, filed January 28, 1958, now Patent No. 3,120,-171, in the names of Marchand B. Hall and Sidney V. Hettinger, Jr. Such a strapping head automatically feeds a length of strap from a supply source, permits the length of strap to be encircled into a strap loop, automatically shrinks the strap loop onto an object, and secures the overlapping ends of the strap loop together and severs the strap loop from the supply source.

When the carriages 12 and 17 are in their upper positions, a strap guide 27 secured to the strapping head 25 has its ends aligned with two strap guide segments 28 and 29 supported from the I-beams 10 and 11. Also, the strap guide segments 28 and 29 have their ends aligned with the ends of another strap guide segment 30 mounted on the carriage 12. When all of these strap guide segments are in alignment with each other, the strapping head 25 can feed a strap in a continuous path through them to form a strap loop. Then, when a coil 31 is positioned on a conveyor 32 centrally below the strap guide segments 28 and 29, the carriages 12 and 17 are lowered to lower the strap loop 33 formed by actuation of the strapping head 25 around to a positon encircling the coil 31. Arms 134, positioned one on either side of the coil position location, are pivotally mounted on the carriage 12 to be elevated and lowered with such movement of the carriage 12. They are intended as support for the strap loop 33 during the downward movement of the carriage 12 and the strapping head 25 so that the strap loop 33 does not sag. The strap guides 28 and 29 are provided with well known releasable means for releasably holding strap therein. An example of this type of releasable means is disclosed in United States Patent 2,853,938, issued September 30, 1958, in the names of Marchand B. Hall and Alvin L. Winkler.

Figure 2:
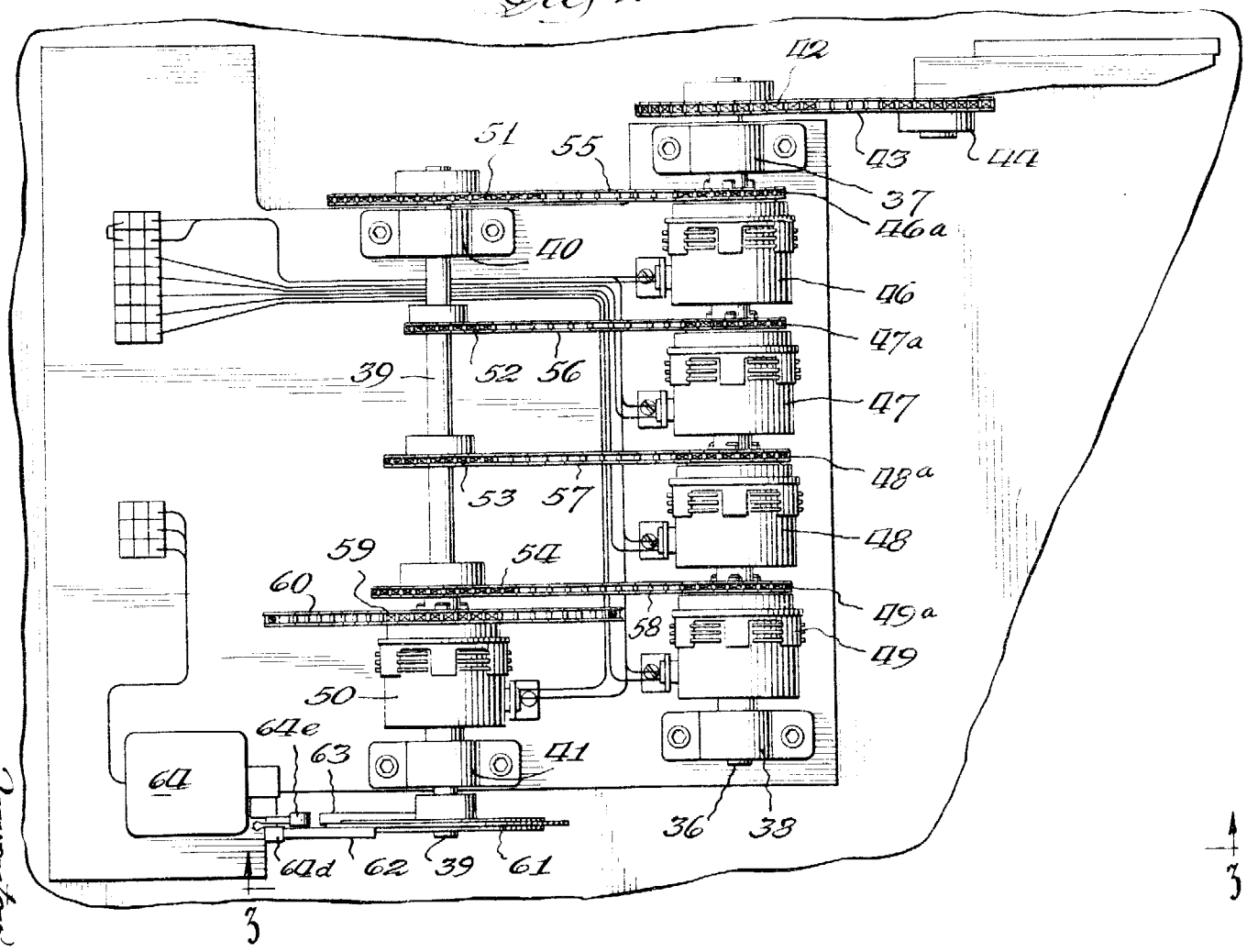
FIG. 2 shows a top plan view of the principal components of the control means embodied in the strapping machine of FIG. 1.
Figure 3:
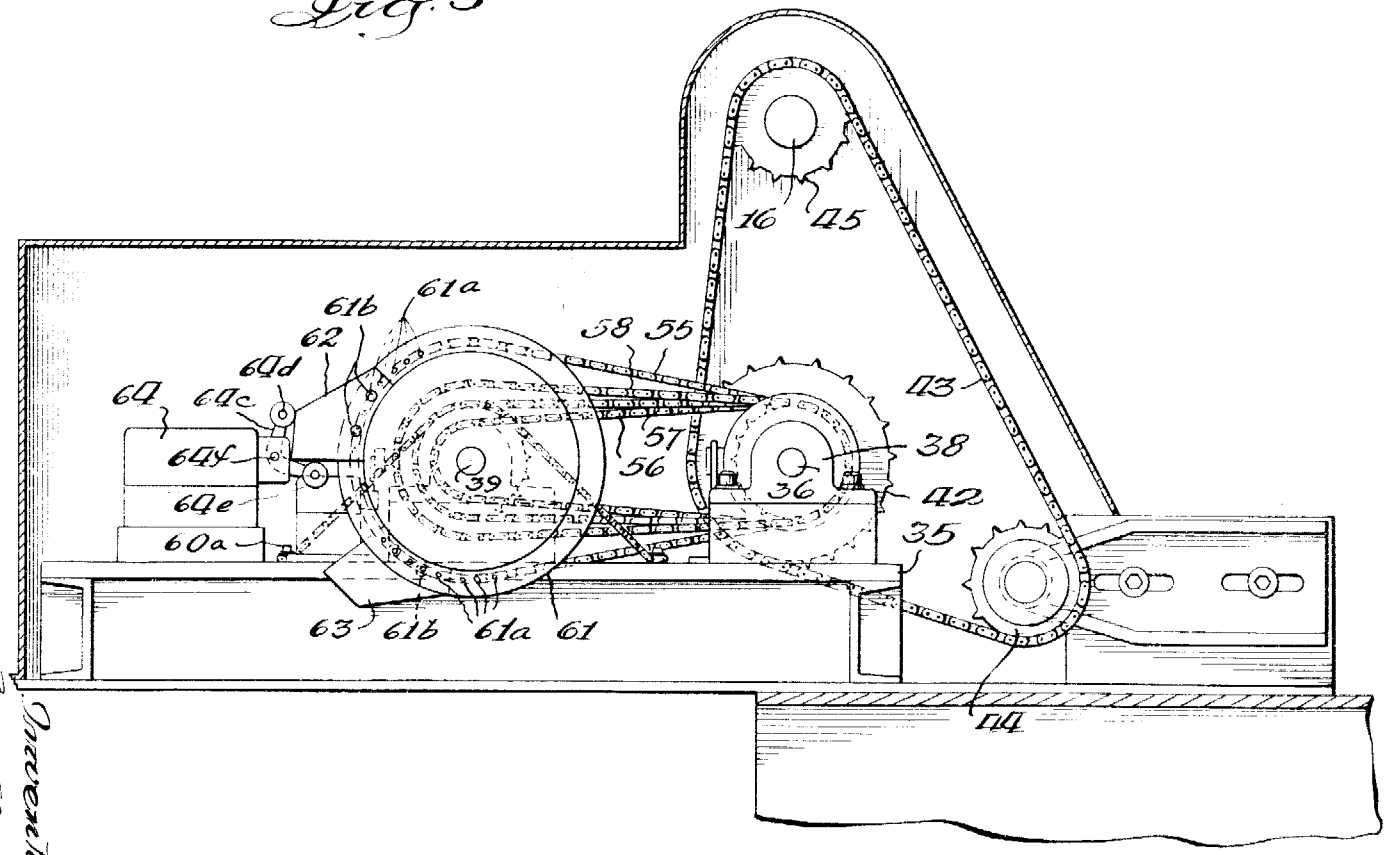
FIG. 3 shows a view along the line 3—3 of FIG. 2 and particularly shows the relationship of a control cam with two switches actuated by it.
Figure 11:
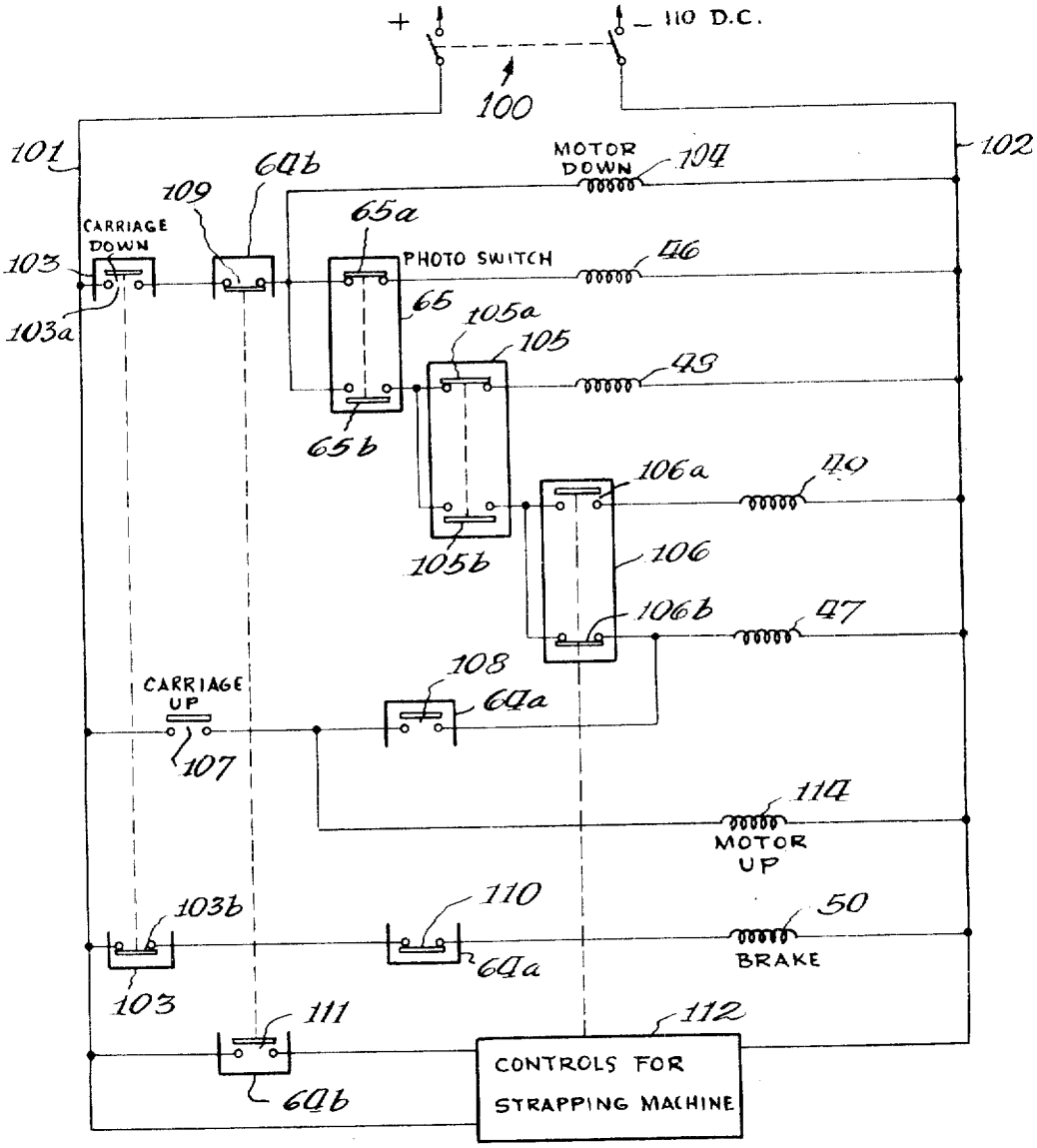

Also mounted on the I-beam 11 is a control box 34 in which is the control mechanism shown in FIGS. 2 and 3.

The control mechanism consists of a mounting plate 35 carrying a driven shaft 36 journaled in two bearings 37 and 38 secured to the support plate 35. It also carries a control or cam shaft 39 journaled in two bearings 40 and 41. The end of the driven shaft 36 has secured to it a sprocket 42 which drives a chain 43 encircling it, an idler sprocket 44 journaled in a fixed location on the apparatus and another sprocket 45. The sprocket 45 is secured to the main drive shaft 16 shown in FIG. 1. As this main drive shaft 16 is rotated, this causes rotation of the driven shaft 36. This driven shaft 36 is provided with four magnetic clutches 46, 47, 48 and 49 which can be selectively energized electrically. They are provided with sprockets 46a, 47a, 48a and 49a, respectively. The magnetic clutches are of a well-known type which can be purchased in assembled form. They are of a type which, when energized, cause the sprocket associated with a clutch to be driven by the shaft associated with it. For example, if magnetic clutch 46 is energized, it will cause the shaft 36 to drive the sprocket 46a. Likewise, if any of the other clutches are energized, their respective sprockets will be caused to rotate with the driven shaft 36.

The cam or control shaft 39 is provided with magnetic clutch 50 which is designed to act as a brake and it also carries four other sprockets 51, 52, 53 and 54. Although the sprockets 46a, 47a, 48a and 49a are all of the same diameter, the sprockets 51, 52, 53 and 54 are all different diameters in order to provide different speed ratios between the sprockets. The sprocket 46a drives the sprocket 51 opposite it by means of a chain 55, the sprocket 47a drives sprocket 52 opposite it by means of a chain 56, the sprocket 48a drives sprocket 53 opposite it by means of a chain 57 and the sprocket 49a drives sprocket 54 opposite it by means of a chain 58. Another sprocket 59 associated with the clutch or brake 50 is prevented from rotation by means of a chain 60 wrapped over it with the ends of the chain secured by two screws 60a to the support plate 35. The effect of energizing the clutch or brake 50 is to arrest rotation of the cam or control shaft 39.

At the end of the shaft 39 opposite to the end on which the sprocket 51 is secured, a cam 61 is mounted. This cam 61 is provided with two cam segments 62 and 63. These cam segments are aligned with the arm 64c of a switch 64 to cause actuation of the switch 64 as the cam rotates.

With the arangement of parts as shown, the control device can be employed to control the vertical travel of the carriage 17 so that it can stop in alignment with the mid-level of the coil 31 or at one-third levels of the coil, as hereinafter described, although the components can be replaced or changed to allow the carriage 17 to be aligned at other levels of the coil 31. It should be emphasized that the functioning of the control means is independent of the height of the coil. It operates on ratios of movement rather than actual differences, which should be apparent as the operation is described.

Regardless of the levels at which the carriage 17 is to be arrested in motion, the ratios of the sprockets 51 and 46a associated with the magnetic clutch 46 are such that, if the clutch 46 is energized for the full time, the control cam 61 is rotated a full revolution as the carriage 17 is lowered by the motor 21 from its fully elevated position to its lowermost position corresponding to the upper surface of the conveyor 32 which in all cases is the lower edge of a coil 31, regardless of the height of the coil.

Assuming that the carriage 17 is to be lowered to the mid-level of a coil, the magnetic clutch 46 is energized as the motor 21 initiates downward travel of the carriage 17. This begins rotation of the control cam 61. Assuming no coil is in place, the cam would complete a single revolution by the time the cariage 17 reached the upper level of the conveyor 32. However, if a coil 31 is in place as shown in FIG. 1, the situation is different. Additional means are provided to sense the upper surface of the coil 31. The means employed consists of a photoelectric cell 65 mounted in a fixed position on the carriage 17. It is in direct alignment to receive impingement of a light beam 66 from a directional light source 67. The beam 66 is aligned to intersect the path of travel of the coil 31. As the carriage 17 is lowered, the coil 31 intercepts the light beam 66 and prevents it from impinging upon the photoelectric cell 65. As this occurs, the electrical circuitry is such that the magnetic clutch 46 is de-energized and another clutch 48 is energized. In the particular case mentioned, if the ratio of the sprocket 51 to the sprocket 46a is two to one, then the ratio of the sprocket 53 to the sprocket 48a is one to one. As a result of this, the driven shaft 36 will cause the cam shaft 39 to rotate twice as fast after the clutch 48 is energized as when the clutch 46 is energized. The result is that the control cam 61 will have achieved a full revolution by the time the carriage 17 has reached the mid-level of the coil 31. The switch 64 is then actuated by the cam 61 to arrest the travel of the carriage 17. At this time the strapping head 25 can be actuated to cause the strap loop 33 to be shrunk and secured onto the coil 31 at the mid-point of the coil 31 with which it is aligned.

Assuming that the carriage 17 is to be lowered first to a level one-third the ditsance from the top of the coil and then to a level at a distance two-thirds from the top of the coil in order to align the strapping head 25 for positioning straps at the one-third and two-third levels of the coil, the magnetic clutch 46 is energized when the carriage 17 is in its uppermost position. As the magnetic clutch 46 is energized, the motor 21 is simultaneously energized to initiate the downward travel of the carriage 17 and rotation of the control cam 61 begins. As the light beam 66 is intercepted by the top of the coil 31, the photoelectric cell 65 is such that the magentic clutch 46 is de-energized and the circuit is prearranged so that another clutch 47 is energized. The ratio of diameters of the sprocket 52 to the sprocket **47*a* is one to one and one-half with the result that the driven shaft 36 will cause the cam shaft 39 to rotate three times as fast after the clutch 47 is energized as when the clutch 46 is energized. The result is that the cam 61 will have achieved a full revolution by the time the carriage 17 has reached the one-third level from the top of the coil 31. The switch 64 is then actuated by the cam 61 to arrest the travel of the carriage 17. At this time, the strapping head 25 can be actuated to cause the strap loop 33 to be shrunk and secured onto the coil 31 at the one-third level from the top of the coil 31** with which it is aligned.

After application of the strap at the one-third level, the carriage 17 is controlled to be returned to its uppermost position and the clutch 46 is energized simultaneously with energizing the motor 21 for another downward travel of the carriage 17. This time, when the light beam 66 is intercepted by the top of the coil 31, the clutch 46 is de-energized and the clutch 49 is energized. The ratio of the sprocket 54 to the sprocket 49a is one and one-third to one with the result that the driven shaft 36 will cause the cam shaft 39 to rotate one and one-half times as fast after the clutch 49 is energized as when the clutch 46 is energized. This has the effect of allowing the control cam 61 to achieve a full revolution by the time the carriage 17 has reached the two-thirds level from the top of the coil 31. The switch 64 is then actuated by the cam 61 to arrest the travel of the carriage 17. At this time, the strapping head 25 can again be actuated to cause the strap loop 33 to be shrunk and secured onto the coil 31 at the two-thirds level of the coil with which it is aligned. After application of a strap at any level, whether it be the mid-level, the one-third or two-thirds level or any other level, the carriage 17 is controlled to be returned to its uppermost position in readiness for the next cycle.

In order to more clearly understand the full operation, it is necessary to refer to FIG. 4 which shows a simplified wiring diagram for the clutches and switches used with the apparatus.

A master switch 100 is connected to direct 110 volt D.C. current across the conductors 101 and 102. In one main branch circuit connected between the connectors 101 and 102 are the contacts 103a of the carriage down control switch 103, switch contacts 109 of the switch 64b, photo switch 65a and magnetic clutch 46. Between the switches 64b and 65a is connected another branch circuit leading to a conductor 102 and it contains a motor down control solenoid 104. In another branch circuit starting at the same point and connected to conductor 102 is another photo switch 65b, selector switch contacts 105a and a magnetic clutch 48. Another branch circuit is connected from between the photo switch 65a and the selector switch contacts 105a to the conductor 102 and it contains selector switch contacts 105b, selector switch contacts 106a and a magnetic clutch 49. Connected between selector switch contacts 105b and selector switch contacts 106a is another branch circuit leading to conductor 102 and it contains selector switch contacts 106b and a magnetic clutch 47.

Another circuit leads from conductor 101 to a carriage up control switch 107, switch contacts 108 of switch 64a and to a point between selector switch contacts 106b and the magnetic clutch 47. A motor up control solenoid 114 is connected from one side of the switch contacts 108 to the conductor 102. Another branch circuit connected between conductors 101 and 102 contains contacts 103b of the carriage down control switch 103, switch contacts 110 of the switch 64a and the magentic brake 50. Still another branch circuit contains switch contacts 111 of switch 64b which are connected to the controls 112 for the strapping machine connected to the conductor 102.

In operation, assuming, for example, a single strap is to be applied to the mid-level of a coil 31 positioned on the conveyor 32. Under these circumstances, the carriage 17 is elevated to its top position, the strapping machine is actuated by means not shown to feed strap from a source of supply into a strap loop 33 by directing it through the guides 27, 28, 29 and 30. After the strap loop is formed, the carriage down control switch contacts 103b are opened and contacts 103a are closed by manually operating switch 103. Opening contacts 103b de-energizes the brake 50 to allow rotation of the cam shaft 39. Closing contacts 103a causes the magnetic clutch 46 and the motor down control solenoid 104 to be energized. Energizing the magnetic clutch 46 causes the driven shaft 36 to be in driving relationship with the cam shaft 39. Energizing the solenoid 104 causes the motor 21 to rotate in a direction to cause the carriage 17 to lower. As the carriage 17 lowers, the cam shaft 39 is driven by the driven shaft 36 to cause the cam 61 to rotate in a clockwise direction (FIG. 3) and cause segment 62 to move away from the region of the switch 64a. The switch 64a at this time has its contacts 108 closed and its contacts 110 open.

Switch 64 contains both switches 64a and 64b. Switch 64a has the two sets of contacts 108 and 110, as mentioned. Switch 64b has the two sets of contacts 109 and 111. Actually, the four sets of contacts are within a single housing generally referred to as switch 64 and all four sets of contacts are simultaneously actuated as the switch arm 64c is physically actuated. It is only important to indicate that the switch contacts are in the positions as shown in FIG. 4 when the arm 64c is in the position as shown in FIG. 3 which corresponds to the initial setting of the cam 61 at the start of the cycle. Also, it should be pointed out that the switch arm 64c is V-shaped and pivoted on a pivot 64f. Two rollers 64d and 64e are at the two ends of the V-shaped arm 64c and their relative spacing always remains the same. Further, both of these rollers 64d and 64e are in adjacent planes corresponding to the respective planes of the cam segments 62 and 63. The result is that cam segment 62 actuates the switch at the position as shown in FIG. 3 as the cam segment 62 moves against the roller 64d. At the other position of the switch arm 64c, the cam segment 63 will have been rotated counter-clockwise around to move against the roller 64e and thereby change the position of the switch arm 64c. It should be apparent from this that the switch arm 64c has two positions, one position being determined by the cam segment 62 and the other position by the cam segment 63.

As the carriage 17 moves down, the light beam 66 is interrupted by the interception of the coil 31. This causes photo switch 65a to be opened and photo switch 65b to be closed. Opening photo switch 65a de-energizes magnetic clutch 46 and closing photo switch 65b energizes the magnetic clutch 48 to change the driving speed of the cam shaft 39 from control by the magnetic clutch 46 to control by the magnetic clutch 48. The carriage continues downwardly at its same speed, but the cam shaft 39 rotates at twice its initial speed with the result that the cam 61 makes a complete revolution by the time the carriage 17 has reached the mid-level of the coil 31. At full revolution of the cam 61, its cam segment 63 causes actuation of the switch arm 64c to reverse the position of the switch contacts of switches 64a and 64b to the opposite of how they are shown in FIG. 4. Contacts 109 and 110 open and 108 and 111 close. Opening of contacts 109 de-energizes magnetic clutch 48 which removes the driving connection between the shaft 36 and 39. Closing contacts 108 merely sets up the cam shaft control circuit and closing contacts 111 initiates the controls 112 for the strapping machine. At this time, the controls 112 cause the strapping head 25 and its related mechanism to shrink the strap loop 33 onto the coil and sever the strap loop from the supply end of the strap. The particular strapping head 25 used and the controls for its operation may be of many types, as previously mentioned. Opening controls 110 has no effect at this time.

After strapping has been completed, the carriage up control switch 107 is closed to cause the magnetic clutch 47 to be energized and to likewise cause the motor up control solenoid 114 to be energized. Energizing solenoid 114 causes the motor 21 to be rotated in a reverse direction to cause elevation of the carriage 17. Energizing magnetic clutch 47 causes the cam shaft 39 to be rotated in its reverse direction at a rapid speed and it is preferable that the rotation of the cam 61 is completed prior to full return of the carriage 17 to its fully raised position. The reason for this is that the cam shaft 39 is not driven beyond the time that the carriage is driven because the motor 21 drives both and it is essential that the cam 61 be returned to its full initial position prior to again cycling.

When the cam 61 has returned to its initial position, it actuates the switches 64a and 64b to close contacts 109 and 110 and open contacts 108 and 111. Opening contacts 111 removes the possibility of cycling of the strapping machine, closing contacts 109 prepares the circuit for subsequent downward movement of the carriage, closing of contacts 110 applies the brake 50 to hold the cam shaft 39 in its initial position, and opening contacts 108 disengages the magnetic clutch 47. At this time, the carriage 17 is in its upper position ready for another cycle of operation.

Assume that two straps are to be applied in sequence, one at the one-third level and the other at the two-thirds level from the top of the coil 31. Under these circumstances, the carriage 17 is again at its fully elevated position. As already explained fully for the single strap operation, the operation of the machine is the same up until the time the light beam 66 is interrupted by the interception of the coil 31. The only difference is that the selector switch 105 is initially manually actuated to open its contacts 105a and close its contacts 105b. Opening contacts 105a insures that the magnetic clutch 48 will not be operated during this cycle of operation. Closing contacts 105b will allow either magnetic clutch 47 or magnetic clutch 49 to be operated in its place upon de-energization of the magnetic clutch 46 when the light beam 66 is interrupted by the interception of the coil 31.

When the light beam is interrupted, its photo switch 65a is opened and its photo switch 65b is closed. As before, opening photo switch 65a de-energizes magnetic clutch 46. This time, closing photo switch 64b energizes magnetic clutch 47 to alter the driving speed of the cam shaft 39 from control by the magnetic clutch 46 to control by the magnetic clutch 47. The carriage continues downwardly at its same speed, but the cam shaft 39 now rotates at three times its initial speed due to the diameter ratios of the sprockets 47a and 52. With this arrangement, by the time the cam 61 makes a complete revolution, the carriage will have only reached the one-third level of the coil 31. As before, the cam segment 63 repeats the operation of the switch 64 to arrest the downward movement of the carriage 17 and prepare the circuit for the subsequent elevation of the carriage after strapping. After strapping has been completed at the one-third level of the coil, the carriage up control switch 107 is closed and the carriage is again returned to its fully elevated position. Likewise, magnetic clutch 47 is kept energized through closed contacts 108 to insure that the cam shaft 39 is returned to its initial position prior to full elevation of the carriage 17. When the cam shaft 39 and its cam 61 have returned to their initial positions, the circuit is then ready to cycle again.

In order to have the carriage move to the two-thirds level of the coil, instead of the one-third level, the selector switch 106 may be manually actuated to close the contacts 106a and open contacts 106b. The result of this is that the cycling will be the same as for application of the strap at the one-third level of the coil, but the magnetic clutch 49 will be energized instead of the clutch 47 during the downward travel from the time the light beam is intercepted until the cam 61 completes its full revolution.

For convenience, it is possible to cycle in the actuation of the selector switch 105 with the actuation of the strapping head 25 through the controls 112. After the strap is applied at the one-third level, the controls 112 for the strapping machine can be used to automatically activate the switch 105 after the strapping head 25 has applied a strap. Then, after the next strap has been applied at the two-thirds level, it can cause the selector switch 105 to be reversed to its initial position so that the next strap can be applied at the one-third level. In this way, no manual operation of the selector switch 105 is essential.

When the magnetic clutch 49 is energized instead of the magnetic clutch 47 during the downward movement of the carriage 17 for application of a strap at the two-thirds level, the sprocket ratio corresponding to the magnetic clutch 49 is such that the cam 61 is rotated one and one-half times as fast as it is when the clutch 46 is energized.

It should be apparent that different sprockets can be used with different diameter ratios to provide different levels at which the carriage 17 can be lowered.

Also, the cam 61 is provided with a plurality of threaded holes 61a which are the mounting holes for screws 61b which secure the cam segments 62 and 63 to the cam 61. These holes 61 provide several distinct positions of the cam segments on the cam 61. After the initial setting of the cam segments 62 and 62, there is no further need of adjustment unless shifting of either the uppermost or the lowermost level of the carriage 17 is required.

Although only a single preferred embodiment of the invention has been shown and described, it should be clearly understood that the invention can be made in many different ways without departing from the true scope of the invention as defined by the appended claims.

I claim:

1. The combination in a strapping machine comprising, strapping means, a work piece support, means to raise and lower the strapping means relative to the work piece support, arresting means to arrest the lowering of the strapping means, and control means responsive to passage of the strapping means by the upper level of a work piece resting on the work piece support to cause the arresting means to arrest the strapping means at a predetermined level relative to the upper level of the work piece, said control means including a light sensitive relay and a light beam impinging upon said relay with the light beam directed to be interrupted by the work piece as the strapping means is lowered to thereby cause actuation of said relay.

2. The combination in a strapping machine comprising, a strapping head, a work piece support, actuating means to raise and lower the strapping head relative to the work piece support, and control means associated with the actuating means for controlling the level with respect to a work piece resting on said support at which the actuating means is caused to arrest the movement of said strapping head, said control means including a cam shaft and a driving shaft for driving said cam shaft, said driving shaft being driven by said actuating means in direct response to the raising and lowering of the strapping head by said actuating means, a plurality of releasable driving connections between the driving shaft and the cam shaft, each driving connection arranged to cause the driving shaft to drive the cam shaft at a different speed, a cam rotated by said cam shaft to actuate means which causes said actuating means to arrest the lowering of said strapping head upon a predetermined rotation of said cam, a first of said driving connections having a driving speed which causes a full movement of said cam during the full travel of the lowering of the strapping head, and a second of said driving connections having a driving speed which causes a full movement of said cam during less than the full travel downward of the lowering of the strapping head, a signal means arranged to respond to the passage of the strapping head by the upper level of the work piece to cause the first said driving connection to be released from driving the cam shaft and the second said driving connection to be connected to drive said cam shaft.

3. The combination defined by claim 2 characterized by, said signal means including a light sensitive relay and a light beam impinging upon said relay with the light beam directed to be interrupted by the work piece as the strapping means is being lowered to thereby cause actuation of the light sensitive relay, said relay being connected to electrically operate said releasable driving connections.

4. The combination in a strapping machine comprising, a strapping head, a work piece support, actuating means to raise and lower the strapping head relative to the work piece support, and control means associated with the actuating means for controlling the level with respect to a work piece resting on said support at which the actuating means is caused to arrest the movement of said strapping head, said control means including a cam shaft and a driving shaft for driving said cam shaft, said driving shaft being driven by said actuating means in direct response to the raising and lowering of the strapping head by said actuating means, a plurality of releasable electric clutches providing driving connections between the driving shaft and the cam shaft, each driving connection arranged to cause the driving shaft to drive the cam shaft at a different speed, a cam rotated by said cam shaft to actuate means which causes said actuating means to arrest the lowering of said strapping head upon a predetermined rotation of said cam, a first of said driving connections having a driving speed which causes a full movement of said cam during the full travel of the lowering of the strapping head and a second of said driving connections having a driving speed which causes a full movement of said cam during less than the full travel downward of the lowering of the strapping head, a signal means arranged to respond to the passage of the strapping head by the upper level of the work piece to cause the first said driving connection to be released from driving the cam shaft and the second said driving connection to be connected to drive said cam shaft, said signal means including a light sensitive relay and a light beam inpinging upon said relay with the light beam directed to be interrupted by the work piece as the strapping means is being lowered to thereby cause actuation of the light sensitive relay, said relay being connected to electrically operate said electric clutches.

5. The combination in a strapping machine comprising, strapping means, a work piece support, a drive means to raise and lower the strapping means relative to the work piece support, control means for controlling the drive means, said control means including two clutches selectively driven by said drive means, a cam means driven by said clutches, each of said clutches having a different driving ratio with respect to the cam means to thereby cause the drive means to drive said cam means at two different driving speeds relative to the speed of the drive means, the first of said two clutches being engaged to drive the cam means as the strapping means is initially lowered toward the work piece, a first switch means associated with said strapping means actuated in response to the strapping means reaching the upper level of the work piece, a second switch, the connections of said first switch being such as to disengage said first clutch from driving engagement with the drive means and to engage said second clutch into driving engagement with said drive means to thereby change the driven speed of the cam means relative to the drive means, said cam means being arranged to travel a predetermined distance at which time it engages said second switch to actuate it, the second switch being connected to cause disengagement of said second clutch from driving engagement with said drive means and thereby arrest the downward travel of said strapping means.

6. The combination defined by claim 5 characterized by, the said driving ratio of said first clutch with said cam means being a proportion to cause the drive means to drive the strapping means from its uppermost position to its lowermost position while the cam means travels its predetermined distance, and said driving ratio of said second clutch being a proportion to cause the cam means to travel its predetermined distance while the strapping means is lowered only a fraction of its full travel from its uppermost position to its lowermost position.

7. The combination in a strapping machine comprising, strapping means, a work piece support, elevating means to raise and lower the strapping means relative to the work piece support, arresting means to arrest the lowering of the strapping means, and control means actuated in response to the passage of the strapping means by a predetermined portion of a work piece on said work piece support, said control means including a cam provided with two selective drives which drive the cam at different speeds, respectively, means to actuate both the elevating means and one of said selective drives simultaneously to initiate lowering of said strapping means and cause driving of said cam at one speed, said actuation of the control means in response to the passage of the strapping means by a predetermined portion of the work piece causing actuation of the other said selective drive to change the driving of said cam to a second speed without any change in the speed of lowering of the strapping means, said cam having a predetermined travel and a switch means actuated at the end of its travel, the actuation of said switch causing said arresting means to arrest the lowering of said strapping means.

8. The combination in a strapping machine comprising, strapping means, a work piece support, elevating means to raise and lower the strapping means relative to the work piece support, and control means for automatically controlling the elevating means to arrest the strapping means at a predetermined level relative to a work piece on said work piece support, said control means including a cam and a plurality of releasable driving connections for said cam, each of said driving connections causing said cam to be driven at a different speed, said cam having a predetermined travel at the end of which it actuates a switch means, the first of said driving connections being connected to drive said cam at a first speed corresponding to the speed of the elevating means lowers the strapping means, the second of said driving connections being connected to drive said cam at a second speed which is faster than said first speed, said control means causing said first driving connection to be connected during the initial lowering movement of the elevating means and causing said second driving connection to be connected in response to the strapping means passing by a predetermined level of said work piece.

9. The combination in a strapping machine comprising, strapping means, a work piece support, elevating means to raise and lower the strapping means relative to the work piece support, and control means for automatically controlling the elevating means to arrest the strapping means at a predetermined level relative to a work piece on said work piece support, said control means including a light sensitive relay for sensing said predetermined level.

10. The combination defined by claim 8 characterized by, said control means including a light sensitive relay for causing said second driving connection to be connected in response to the strapping means passing by a predetermined level of said work piece.

11. The combination defined by claim 8 characterized by, said driving connections being electrically operated magnetic clutches.

*12. The combination in a strapping machine comprising, strapping means, a work piece support, means for causing relative movement between a work piece supported on the work piece support and the strapping means, arresting means to arrest said relative movement, and control means responsive to the movement of the strapping means and the work piece relative to each other to cause the arresting means to arrest the relative movement at a predetermined location relative to one end of the work piece, said control means including a light sensitive relay and a light beam impinging upon said relay with the light beam directed to be interrupted by interference of the work piece during the relative movement between the strapping means and the work piece.*

*13. The combination in a strapping machine comprising, strapping means, a work piece support, drive means for causing relative movement between a work piece supported on the work piece support and strapping means, arresting means to arrest said relative movement, and control means responsive to movement of the strapping means and work piece relative to each other, said control means including a cam means provided with at least two selective drives which selectively drive the cam means at different speeds, respectively, means to simultaneously actuate both the drive means and one of said selective drives to initiate both relative movement between the strapping means and work piece and cause driving of the cam means at one speed, said actuation of the control means in response to movement of the strapping means and work piece relative to each other by a predetermined amount causing actuation of the other said selective drive to change the driving of said cam means to a second speed without any change in the speed of the relative movement between the strapping means and work piece, said cam means having a predetermined travel and a switch means actuated in the course of its travel, said switch causing said arresting means to arrest the relative movement between the strapping means and the work piece.*

*14. The combination in a strapping machine comprising, strapping means, a work piece support, drive means for causing relative movement between a work piece supported on the work piece support and strapping means, arresting means to arrest said relative movement, and control means for automatically controlling the movement of the strapping means and work piece relative to each other to arrest said relative movement of strapping means and work piece at a predetermined position, said control means including a cam means and a plurality of releasable driving connections for said cam means, each of said driving connections causing said means to be driven at a different speed, said cam means having a predetermined travel, the first of said driving connections being connected to drive said cam means at a first speed corresponding to the speed of the movement of the strapping means and work piece relative to each other, the second of said driving connections being connected to drive said cam means at a second speed which is faster than said first speed, said control means causing said first driving connection to be connected during the initial movement of the strapping means and work piece relative to each other and causing said second driving connection to be connected in response to movement of the strapping means and work piece relative to each other by a predetermined amount.*

References Cited

The following references, cited by the Examiner, are of record in the patented file of this patent or the original patent.

UNITED STATES PATENTS

| | | | |
|---|---|---|---|
| 2,561,169 | 7/1951 | Bickelhaupt | 100—256 X |
| 2,563,542 | 8/1951 | Mackelduff | 53—198 X |
| 2,797,634 | 7/1957 | Rueckert | 100—13 |
| 2,801,507 | 8/1957 | Claus et al. | 53—198 |
| 2,972,843 | 2/1961 | Du Bruff | 53—198 X |
| 3,019,577 | 2/1962 | Slamar et al. | 53—74 |
| 3,179,037 | 4/1965 | Cranston et al. | 100—4 |
| 3,216,346 | 11/1965 | Cruckshank et al. | 100—4 |

BILLY J. WILHITE, *Primary Examiner.*